Figure 4:
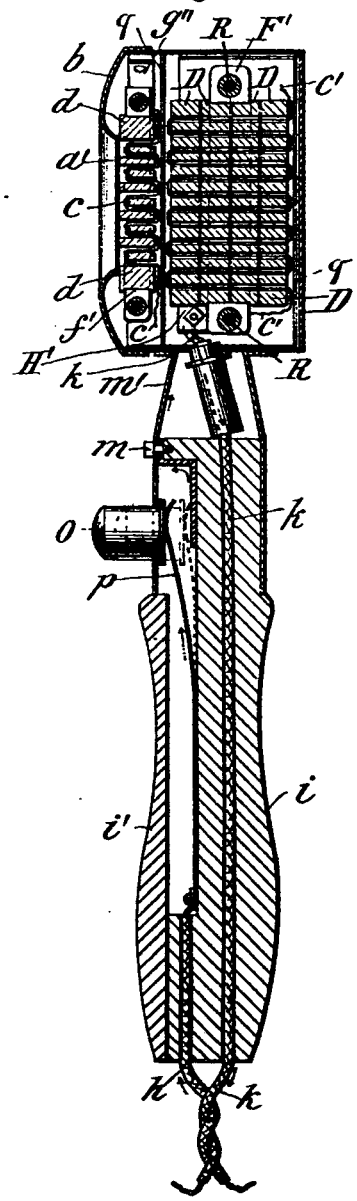

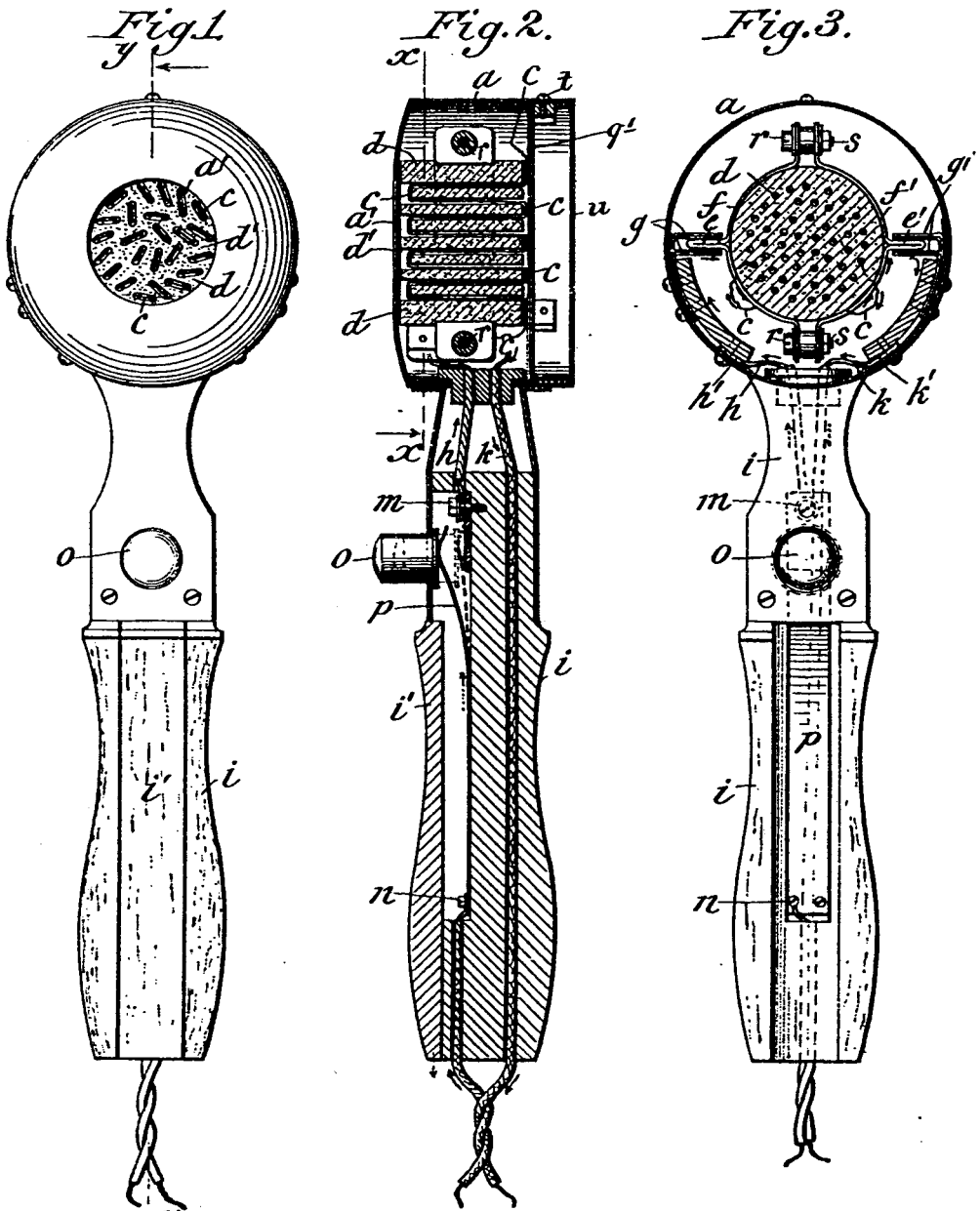

(No Model.) 2 Sheets—Sheet 2.

F. W. SCHINDLER-JENNY.
ELECTRIC CIGAR LIGHTER.

No. 548,396. Patented Oct. 22, 1895.

Attest:
F. H. Schott
Alfred T. Gage

Inventor
Friedrich Wilhelm Schindler-Jenny,
by R. D. Henderson,
Attorney.

UNITED STATES PATENT OFFICE.

FRIEDRICH WILHELM SCHINDLER-JENNY, OF KENNELBACH, AUSTRIA-HUNGARY.

ELECTRIC CIGAR-LIGHTER.

SPECIFICATION forming part of Letters Patent No. 548,396, dated October 22, 1895.

Application filed February 19, 1894. Serial No. 500,659. (No model.) Patented in Austria-Hungary June 7, 1893, No. 31,370 and No. 52,390; in Switzerland June 16, 1893, No. 6,829; in France January 19, 1894, No. 235,637; in Belgium February 1, 1894, No. 108,351, and in Italy March 31, 1894, CXXVII, 35,706.

*To all whom it may concern:*

Be it known that I, FRIEDRICH WILHELM SCHINDLER-JENNY, a citizen of Switzerland, residing at the city of Kennelbach, near Bregenz, Austria-Hungary, have invented certain new and useful Improvements in Electric Cigar-Lighters, (for which I have obtained Letters Patent in Austria - Hungary, No. 31,370 and No. 52,390, dated June 7, 1893; in Switzerland, No. 6,829, dated June 16, 1893; in France, No. 235,637, dated January 19, 1894; in Belgium, No. 108,351, dated February 1, 1894, and in Italy CXXVII, 35,706, dated March 31, 1894;) and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My present invention relates to the application of the electric current to the lighting of cigars and cigarettes, and for other purposes.

The invention has the advantage of having the electric conductor applied to the lighting-surface, as hereinafter specified, in such manner that it is not exposed to mechanical influences through touching or contact therewith of the cigar or other object to be lighted or to have the heat imparted thereto; secondly, the electric conductor can in case of burning off be easily replaced and repaired without injury to the heat-body or the necessity of furnishing a new heat-body.

Furthermore, under the present embodiment of the invention there is no useless waste or consumption of the electrical energy, as the heat generated in the device is controlled and utilized within the device itself for the purpose of heating the igniting-body, whereby it is caused to operate quicker, more intensely, and persistently.

I prefer to construct the device in two ways, either with but one heater, which necessarily can be composed of several thin heaters, or with two or more heaters. In the first case the wire of platinum or the like to be made glowing or incandescent is taken of such a length that it opposes a properly strong resistance to the electric current and can be fastened or connected direct to the conductor without burning. The second arrangement has for its object to limit the application of the glowing wire of platinum or the like for lighting the cigars to the most needful size or quantity. For this purpose I place the platinum or wire in such small and special thin heating-body, which contains just that length of wire which is necessary to directly light the cigar. In the second heating-body, which can be composed of several thin heating-bodies and contained in a similar apparatus, I bring or include the wire necessary for reducing the current. This latter can be of a cheaper material, since it has only to serve the purpose of a shunt-resistance and need not glow. The heat generated in the same is utilized in the operation of the lighter, which heat is absolutely lost when the resistance-wire is placed outside of the apparatus. Furthermore, it is permissible to do this last, in which case then only the smaller heating-body remains with the glow-wire in the apparatus.

Figure 5:
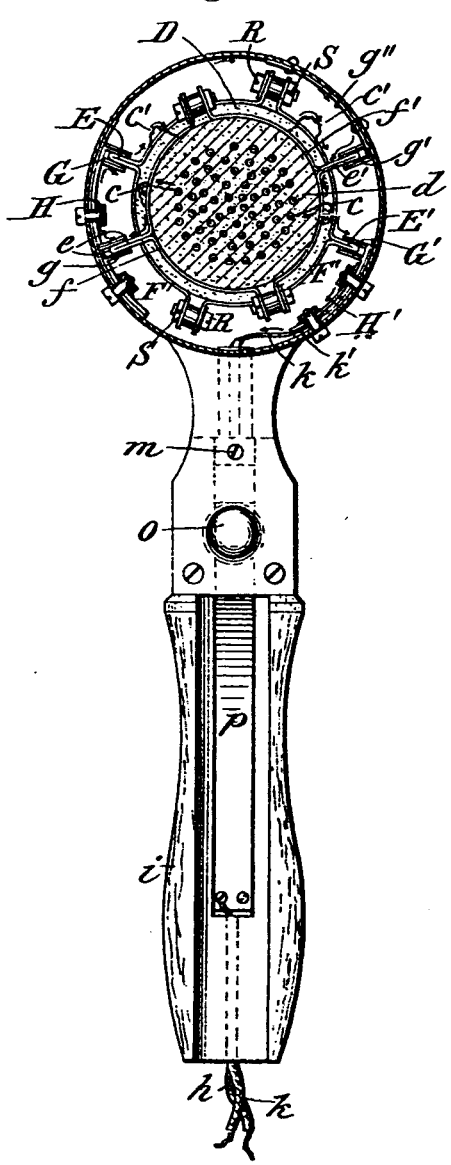

In the accompanying drawings, Figure 1 represents the electric cigar-lighter with a heating-body in front view. Fig. 2 is a vertical section on the line $y$ $y$ of Fig. 1, looking in the direction of the arrow. Fig. 3 is a horizontal section on the line $x$ $x$ of Fig. 2, looked at in the direction of the arrow, with opened slide and partly-visible contact-spring. Fig. 4 is a vertical section through the electric cigar-lighter with two heating-bodies, of which the heating-body, including or having the resistance-wire, is composed of four parts. Fig. 5 is a horizontal section through the electric cigar-lighter with the two heating-bodies.

The apparatus represented in Figs. 1 to 3 consists, broadly, of a heating body or substance $d$, made of insulating material and inclosed in a metallic cap or case $a$ or the like, which body $d$ is provided with holes or apertures which are penetrated by the electric conductor $c$, preferably of platinum wire, which serves to generate heat. On the lighting-surface $d'$ of the heating-body $d$ the electric conductor $c$ is somewhat set back—that is, sunk in small grooves, as seen in Fig. 2—in order to be protected from the mechanical influences—as, for example, from contact with cigars or the like. The heating-body $d$, containing the electric conductor $c$, rests in the hollow space of the metallic cap or case $a$ in such manner that its front side or lighting-surface $d'$ abuts on the opening $a'$ of the metallic cap or case $a$. The heating-body $d$ is bound with or embraced by two metal half-rings $f f'$, insulated from each other and provided with offsets or cheeks $e e'$, and the same are clamped on the heating-body by means of insulated screws $r$ and nuts $s$. The cheeks $e e'$ serve, for one thing, to hold firm the heating-body $d$ in the metallic case $a$, and for this purpose rest in holders or carriers $g g'$ fastened to the wall of the case $a$ and insulated therefrom, and for another thing they serve for the transmission of the main conductors $h k$, which come from the handle $i$. From the conductor $h$ the current goes by $h'$, through the insulated arm of the carrier $g$ into the half-ring $f$, from there through the heat-wire $c$, which winds through or penetrates the heating-body, and then into the half-ring $f'$, thence into the arm of carrier or holder $g'$, which likewise is insulated from the case $a$, and then by the conductor $k'$ into the second return conducting-wire $k$.

Since the heat-wire $c$ is fastened to the two metal half-rings $f f'$, which are insulated from one another and which embrace the heating-body $d$ and the metal half-rings $f f'$ while their cheeks $e e'$ rest in the carriers or holders $g g'$, it is very simple to remove the heating-body, together with its penetrating or interwoven wire $c$, merely by drawing the cheeks $e e'$ out of the holders $g g'$, and, finally, to mend or repair defects or injury in the heat-wire $c$ by simply repairing or substituting another for it without in the least thereby injuring the heat-body $d$.

The conductor $h$ is broken or interrupted in the handle $i$ at $m$ and $n$, and contact can at any time be made by pressure on the contact-button $o$ and its thereby-operated spring $p$, as indicated in dotted lines in Fig. 2. The handle $i$ is provided with a slide $i'$, whose object is to permit of attachment of wire $h$ and investigation in case of possible defects of the contact-spring $p$.

In Figs. 4 and 5 is represented an electric cigar-lighter with two heat-bodies $d$ and D, in vertical and horizontal section, of which the heating-body $d$ is designed to receive or hold the glow or incandescent wire $c$, while the larger heat-body D receives the resistance-wire $c'$.

In order to facilitate the method of manufacture of the larger heat-body D, which receives the long resistance-wire $c'$ and which cannot so easily be made out of one piece, it is suitable, as shown in Fig. 4, to compose the same out of several thin overlying heat-bodies D D D D, in such way that their openings for the wire $c'$ register. The bearings of both heat-bodies $d$ and D are made in the same manner as with the heat-body represented in Figs. 1 to 3.

In Figs. 4 and 5 the metal case $a$ is provided with a cover $b$, having an opening $a'$, and it can be secured on the case $a$ in any way with screws, bayonet-joint, or the like. The heat-body D, carrying the resistance wire $c'$, is like the other surrounded or embraced by two insulated metal half-rings F F', held together by insulated screws R and nuts S, and formed with the cheeks E E', which rest in the holders G G', fastened on the wall of the case $a$ by arms H H' and insulated from the wall of the case. Similarly the heating-body $d$, carrying the glow-wire $c$, is embraced by the metal half-rings $f f'$, and so supported or seated that its lighting or igniting surface $d'$ registers with the opening $a'$ of the cover $b$. The cheeks $e e'$ of the half-rings $f f'$, insulated from each other, rest in holders $g g'$, the holder $g$ being on the arm H, which is common to both it and the holder G, which arm H is insulatedly attached to the wall of the case $a$, while the arm $g''$ of the holder $g'$ for the cheek $e'$ is not insulated from the wall of the case. The arm $g''$, in this instance, is fastened to the wall without insulation, for the reason that the case may serve as a conductor for the one pole $h$. Consequently the current of the conductor $h$ will pass by a pressure on the contact-button $o$ through the spring $p$, screw $m$, metal connecting-strip $m'$, and wall of the case $a$, until it reaches the uninsulatedly-attached arm $g''$, and from there on through the holder $g'$, cheek $e'$, half-ring F', and the thereto-attached glow-wire $c$, through whose whole length the current will flow to the second half-ring $f$, from whence to the cheek $e$, holder $g$ on the common arm H, to holder G, cheek E on the metal half-ring F, to reach the resistance-wire $c'$, penetrating the larger heat-body D, and from which wire $c'$ it goes to the second metal half-ring F', cheek E', and holder G', and insulatedly-attached arm H', to which the return conductor $k$ is fastened at K'.

Obviously the conductor $h$ can be connected with the holder $g'$ directly without making use of the wall of case $a$, and in which case the arm $g''$ must be insulatedly fastened to the wall of the case. As a precaution against contact between the wires $c$ and $c'$ or short-circuiting between the wires, it is desirable to attach an insulating-strip $q$, Fig. 4, between the heat-body $d$, carrying the glow-wire $c$, and the heat-body D, carrying the resistance-wire $c'$, as well as on the floor or base of the case $a$.

By means of the arrangement of the heat-bodies represented in Figs. 4 and 5 an exchange of the same is easily possible in order to allow of possible repairs being easily made, not only to the heat-body $d$, but also the heat-body D, by simply removing cap $b$ and lifting the heat-bodies out of their holders.

In using the electric cigar-lighter, handle $i$ is grasped by the hand and contact-button $o$ pressed with the thumb, whereby contact in the conductors $h$ and $k$ is made, so that the platinum wire connected with the conductors is made to glow, and by contact of the cigar with the igniting-surface $d'$ of the insulated body $d$ the same is set on fire or lighted.

Obviously my cigar-lighter can be finished in the form of a stand or of any desired form.

It is preferred to employ a sheet of mica as the insulating-strip $q$, between the two heat-bodies $d$ and $D$, as that will prevent the current passing from the heat-body $D$ to the heat-body $d$ by accidental contact of the wires of the two heat-bodies in the space between the heat-bodies, or otherwise, and yet will not prevent the transmission or radiation of heat from the body $D$ to the body $d$.

Under the construction illustrated in Figs. 4 and 5, wherein the two heat-bodies are used, the wire for the heat-body $d$ may be a platinum wire, as that will give the best glow, while the wire which traverses the heat-body $D$ may be of a cheaper or inferior wire, as the wire running through the body $D$ is used only as a resistance-wire. In the form illustrated in Figs. 1 to 3, however, the wire traversing the heat-body $d$ is preferably a platinum wire, so as to afford the best glow. The length of this wire, however, is such that it will constitute the resistance as well as the glow wire. Under both forms I am enabled to inclose or embody the resistance as well as the glow wire in the apparatus itself, thus dispensing with the necessity of devices or appliances separate and apart from the lighting apparatus for the purpose of obtaining the necessary resistance.

I have illustrated the wires in the heat-bodies of both forms of devices as lying loosely in the channels or openings through the heat-body; but these wires may be made to fit snugly in the channels or openings, or after the wires have been passed through the channels or openings the channels can be filled in with suitable insulating material. In all the instances it is desirable to employ an insulating material which will not be softened by the heat of the wires, so as to guard against a short-circuiting.

As illustrated in Figs. 4 and 5, the heat-bodies can be removed from the face of the lighter after removal of the cap $b$, while under the form illustrated in Figs. 1 to 3 the heat-bodies can be removed through the back of the case $a$ by simply loosening the screws $p$ and removing the filling-cap $u$, illustrated in Fig. 2 of the drawings. It is preferred to place a sheet of mica $q'$ on the face of the filling-cap $u$, next to the wire $c$, so as to prevent short-circuiting by accidental contact of the wires with the filling-cap.

While this invention is particularly well adapted for cigar-lighters, still it is obvious that it is applicable in many of its features to other forms of electric heating-bodies designed for other uses, and I desire to cover the novel features to whatever particular use they are adapted and may be applied in an electrically-heated apparatus.

The advantage of using two separate heat-bodies is that a costly conducting-wire, such as platinum, can be restricted to the minimum of space for affording the necessary glowing part of the conducting-wire, inasmuch as this wire need only be used in the smaller heat-body of the two, whereas the largest part of the conducting-wire used for resistance purposes may be of a cheaper material. Again, if but one heat-body were used it would be necessary to make it of such dimensions as to contain a sufficient length of wire to afford the necessary resistance, and the larger the heat-body the more heat it absorbs, and consequently a longer time required to heat it and a longer time required to light the cigar, whereas if the heat-body containing the glow-wire is made smaller than the body containing the resistance-wire it will be much more quickly heated and the lighting of the cigar effected in a much shorter period of time. Furthermore, by making the glow heat-body smaller than the resistance-wire heat-body it can be made of a different material, such as mica or the like, which will combine thinness with strength, and thus be capable of being heated more quickly and at the same time possess sufficient strength for durability.

Having described my invention and set forth its merits, what I claim is—

1. In an electric heater, the combination of two separate heat bodies each provided with parallel channels or openings extending through it from the top to the bottom, two separate conductors applicable respectively to the said heat bodies and running each alternately from the top to the bottom and vice versa through the said channels or openings, and a case to receive the heat bodies with the conductors, substantially as and for the purposes described.

2. In an electric heater, the combination with the conductors $h\ k$, of a heat body containing a glow conductor, and a second heat body containing a resistance conductor in heat giving proximity thereto, the conductors of the heat bodies being in circuit with the conductors $h\ k$, substantially as and for the purposes described.

3. In an electric heater, the combination with conductors $h\ k$, of a heat body containing a glow conductor, and a second heat body containing a resistance conductor and placed under or back of and apart from the other heat body to leave a space between the two bodies, the conductors of the two heat bodies being in circuit with the conductors $h\ k$, substantially as and for the purposes described.

4. In an electric heater, the combination with a case or shell, of a heat body containing a glow conductor, and a second heat body of larger dimensions containing a resistance conductor, thereby adapting said bodies to contain conductors of different materials and one of said bodies to be heated in less time than the other and one removed from the case without the other, the conductors of the heat bodies being in circuit with the conductors $h$ $k$, substantially as and for the purposes described.

In witness whereof I have hereunto set my hand in presence of two witnesses.

FRIEDRICH WILHELM SCHINDLER-JENNY.

Witnesses:
JULIUS A. BOUREY,
H. ROBHAUP.